(12) United States Patent
Kubiak et al.

(10) Patent No.: US 10,859,000 B2
(45) Date of Patent: Dec. 8, 2020

(54) SYSTEM FOR ROTATING A FAN OF A TURBOJET ENGINE

(71) Applicant: SAFRAN AIRCRAFT ENGINES, Paris (FR)

(72) Inventors: Guillaume Patrice Kubiak, Moissy-Cramayel (FR); Nils Edouard Romain Bordoni, Moissy-Cramayel (FR); Michel Gilbert Roland Brault, Moissy-Cramayel (FR); Romain Guillaume Cuvillier, Moissy-Cramayel (FR); Benoit Jean Henri Gomanne, Moissy-Cramayel (FR); Arnaud Nicolas Negri, Moissy-Cramayel (FR); Nicolas Xavier Trappier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/076,294

(22) PCT Filed: Feb. 8, 2017

(86) PCT No.: PCT/FR2017/050287
§ 371 (c)(1),
(2) Date: Aug. 7, 2018

(87) PCT Pub. No.: WO2017/137701
PCT Pub. Date: Aug. 17, 2017

(65) Prior Publication Data
US 2019/0153958 A1 May 23, 2019

(30) Foreign Application Priority Data
Feb. 8, 2016 (FR) ..................... 16 50970

(51) Int. Cl.
*F16H 1/28* (2006.01)
*F02C 7/36* (2006.01)
(Continued)

(52) U.S. Cl.
CPC .............. *F02C 7/36* (2013.01); *F01D 5/3007* (2013.01); *F02K 3/04* (2013.01); *F16C 1/02* (2013.01);
(Continued)

(58) Field of Classification Search
CPC . F02C 7/36; F02K 3/04; F01D 5/3007; F16H 1/28; F16H 57/031; F16H 57/082;
(Continued)

(56) References Cited

U.S. PATENT DOCUMENTS 3,486,394 A * 12/1969 Gunther ................ F16H 1/08
74/458
4,751,816 A 6/1988 Perry
(Continued)

FOREIGN PATENT DOCUMENTS

| EP | 2009262 A2 | 12/2008 |
|---|---|---|
| EP | 2009270 A2 | 12/2008 |

(Continued)

OTHER PUBLICATIONS

Preliminary Research Report received for French Application No. 1650970, dated Oct. 27, 2016, 3 pages (1 page of French Translation Cover Sheet and 2 pages of original document).
(Continued)

*Primary Examiner* — Roger L Pang
(74) *Attorney, Agent, or Firm* — Womble Bond Dickinson (US) LLP (57) ABSTRACT

The invention relates to a system for rotating a fan (2) of a turbojet engine (1) about a first rotation axis Ω, including a reduction gear (3) made up of a planetary gearset placed at
(Continued)

the centre of the fan (2), which includes: a central sun gear (31); an outer planet gear (33) attached to the fan (2); at least one satellite gear (32) arranged between the central sun gear (31) and the outer planet gear (33) in order to transmit a rotary movement between the central sun gear (31) and the outer planet gear (33); characterised in that the outer planet gear (33) includes an inner portion (33a) which meshes with the satellite gear (32), as well as an outer portion (33b) to which blades (21) of the fan (2) are directly attached.

20 Claims, 6 Drawing Sheets (51) Int. Cl.
| | | |
|---|---|---|
| F01D 5/30 | (2006.01) | |
| F02K 3/04 | (2006.01) | |
| F16C 1/02 | (2006.01) | |
| F16H 57/08 | (2006.01) | |
| F03D 15/00 | (2016.01) | |
| F16H 57/02 | (2012.01) | |
| F16H 57/031 | (2012.01) | |

(52) U.S. Cl.
CPC ............ *F16H 1/28* (2013.01); *F16H 57/082* (2013.01); *F03D 15/00* (2016.05); *F05D 2240/62* (2013.01); *F05D 2260/40311* (2013.01); *F16H 57/031* (2013.01); *F16H 2057/02078* (2013.01)

(58) Field of Classification Search
CPC ............ F16H 2057/02078; F16C 1/02; F05D 2260/40311; F05D 5/30; F05D 2240/62; F03D 15/00
USPC ........................................................ 475/331
See application file for complete search history.

(56) References Cited

U.S. PATENT DOCUMENTS

| | | | | |
|---|---|---|---|---|
| 4,964,844 | A * | 10/1990 | Bagnall | B64C 11/48 475/295 |
| 5,910,066 | A * | 6/1999 | Schulz | F16H 1/2863 475/331 |
| 8,756,908 | B2 * | 6/2014 | Sheridan | F02C 7/06 60/39.08 |
| 8,869,504 | B1 * | 10/2014 | Schwarz | F02K 1/09 60/226.1 |
| 9,133,729 | B1 * | 9/2015 | McCune | F02C 7/20 |
| 2008/0000216 | A1 * | 1/2008 | Fujimura | F02K 3/04 60/226.1 |
| 2014/0064915 | A1 | 3/2014 | Masson et al. | |
| 2014/0066246 | A1 * | 3/2014 | Sappenfield | F16H 37/0813 475/149 |
| 2014/0334922 | A1 * | 11/2014 | Fabre | B64D 29/08 415/201 |
| 2016/0017746 | A1 * | 1/2016 | Husband | F01D 5/02 415/1 |
| 2016/0040541 | A1 * | 2/2016 | Cosby | F01D 5/141 416/219 R |

FOREIGN PATENT DOCUMENTS

| | | |
|---|---|---|
| FR | 2972765 A1 | 9/2012 |
| WO | 2015/094607 A1 | 6/2015 |

OTHER PUBLICATIONS

International Search Report and Written Opinion received for PCT Patent Application No. PCT/FR2017/050287, dated May 16, 2017, 20 pages (10 pages of English Translation and 10 pages of Original Document).

* cited by examiner

SYSTEM FOR ROTATING A FAN OF A TURBOJET ENGINE

GENERAL TECHNICAL FIELD

The present invention relates to an architecture of a turbojet. More precisely, it relates to a system for rotating a fan of a double flow, two spool turbojet.

PRIOR ART

A double flow two-spool turbojet comprises a fan which is disposed upstream of said turbojet and which has as its function increase the efficiency of the turbojet by creating a secondary flow which will not pass into the combustion chamber of the turbojet, unlike the primary flow. The secondary flow has a moderate speed but a significant flow rate, thus allowing it to generate the main thrust of the turbojet.

The fan is driven in rotation by a low-pressure shaft (or "BP shaft" according to the terminology conventionally used in the field of aeronautics) which is itself driven in rotation by a low-pressure turbine (or "BP turbine" according to the terminology conventionally used in the field of aeronautics) which is disposed downstream of the combustion chamber. The fan having a considerable diameter, its rotation speed must not be too high in order to obtain effective operation. Thus a reduction gear is disposed between the BP shaft and the fan so as to adapt the rotation speed of the fan depending on its diameter.

According to a standard turbojet architecture, the reduction gear is situated below an inlet casing for the primary flow; this inlet casing being situated downstream of the fan with respect to the air flow circulating in the turbojet. The reduction gear is connected at the inlet to the BP shaft, and is connected at the outlet to a fan shaft. The fan shaft drives the fan directly in rotation. This architecture encounters a problem of bulk, of weight, and does not allow easy accessibility to the reduction gear during various maintenance operations.

Document FR2972765 describes a system for rotating a fan of a turbojet in which the reduction gear of the fan is a planetary gearset. A central sun gear of the reduction gear is connected with the BP shaft, a satellite carrier is connected with the HP shaft which is driven in rotation by a high-pressure turbine situated downstream of the combustion chamber, and an outer planet gear forming an external ring is connected with the fan so as to drive it in rotation.

However, the system presented in document FR2972765 has numerous disadvantages.

It has considerable bulk.

In addition it does not allow the absorption of the considerable forces generated by the rotation of the fan.

Moreover, it does not allow simple and rapid access to the reduction gear assembly.

Also known is document U.S. Pat. No. 4,964,844 which describes the use of a reduction gear formed from a planetary gearset to drive a propeller in rotation. However, the solution described in U.S. Pat. No. 4,964,844 has considerable bulk and does not allow simple and rapid access to the reduction gear assembly. In fact, in document U.S. Pat. No. 4,964,844, the reduction gear is connected by a rotor which surrounds the reduction gear and which is connected kinematically to the outer planet gear of said reduction gear, the blades of the propeller being attached to said rotor.

Also known is document EP2009262. However, the solution described in this document has considerable bulk, does not allow the absorption of the considerable forces generated by the rotation of the fan, and does not allow simple and rapid access to the reduction gear assembly.

GENERAL PRESENTATION OF THE INVENTION

One general goal of the invention is to propose a simple solution allowing a system for rotating a fan to be obtained having both a small bulk and low weight.

Another goal of the invention is to propose a simple system for rotating a fan which resists the forces created by centrifugal force due to the rotation of the fan.

An additional goal of the invention is to propose a system for rotating a fan for which maintenance is simplified.

To this end, a system for rotating a fan of a turbojet around a first axis of rotation is proposed comprising a reduction gear formed from a planetary gearset which is situated in the center of the fan and which comprises:
- a central sun gear;
- an outer planet gear attached to the fan;
- at least one satellite arranged between the central sun gear and the outer planet gear for a transmission of a rotation movement between the central sun gear and the outer planet gear;

the outer planet gear comprising, on the one hand, an internal portion which meshes with the satellite, and on the other hand an external portion to which are directly attached the blades of the fan.

Such a system allows combining a system for rotating the fan having a reduced bulk and weight, with simplified accessibility to the reduction gear of the fan during maintenance operations.

Such a system is distinguishable from the system described in document U.S. Pat. No. 4,964,844 particularly in that the reduction gear is situated in the center of the fan while in document U.S. Pat. No. 4,964,844 the fan and the reduction gear do not have a plane perpendicular to the axis of rotation of said fan passing through them, the fan either being situated farther downstream, or farther upstream. Moreover, in document U.S. Pat. No. 4,964,844, the blades are not directly attached to the outer planet gear but to a rotor, said rotor being connected kinetically to the outer planet gear.

According to one possible feature, the same plane perpendicular to the first axis of rotation, passes through the reduction gear and the blades of the fan.

According to another feature, the same plane perpendicular to the first axis of rotation passes through the blades of the fan and the teeth of the outer planet gear which mesh with the satellite.

According to an additional feature, the external portion of the outer planet gear is attached by a first end to a casing of the turbojet by a pivot connection, said external portion also comprising, at a second end, a balancing portion extending radially toward the interior with respect to the first axis of rotation and protruding from the outer planet gear.

According to an additional feature, the pivot connection comprises a ball bearing and a roller bearing.

According to a particular feature, the outer planet gear is a single piece.

According to an additional feature, the internal portion of the outer planet gear is formed from a first wheel comprising teeth which mesh with the satellite, and the external portion of said outer planet gear is formed from a second wheel with is attached to said first wheel forming the internal portion of the outer planet gear.

According to another feature, the satellite is mounted in rotation on a satellite carrier comprising a main axis of elongation, said satellite carrier being held fixed with respect to the casing of the turbojet.

According to an additional feature, the central sun gear is attached to a shaft which comprises an elastic deformation zone allowing radial and axial displacement of the central sun gear with respect to the first axis of rotation, and/or the satellite carrier comprises an elastic deformation zone allowing radial and axial displacement of the satellite with respect to the first axis of rotation.

According to a particular feature, the central sun gear, the outer planet gear and the satellite have conical teeth.

According to an additional feature, the central sun gear, the satellite and the outer planet gear have straight teeth, and the outer planet gear comprises a tooth root the depth of which increases along the first axis of rotation.

According to another feature, the reduction gear is situated in a casing which comprises a removable cover which is situated opposite said reduction gear.

According to one possible feature, the blades comprise a root in the form of a dovetail which is embedded in a slot of complementary shape formed in the external portion of the outer planet gear.

According to another aspect, the invention consists of a double flow two-spool turbojet comprising a system for rotating a fan according to one of the preceding features.

DESCRIPTION OF THE FIGURES

Other features, goals and advantages of the present invention will appear upon reading the detailed description that follows, and with reference to the appended drawings, given by way of non-limiting examples and in which.

DETAILED DESCRIPTION OF THE INVENTION

Figure 1:
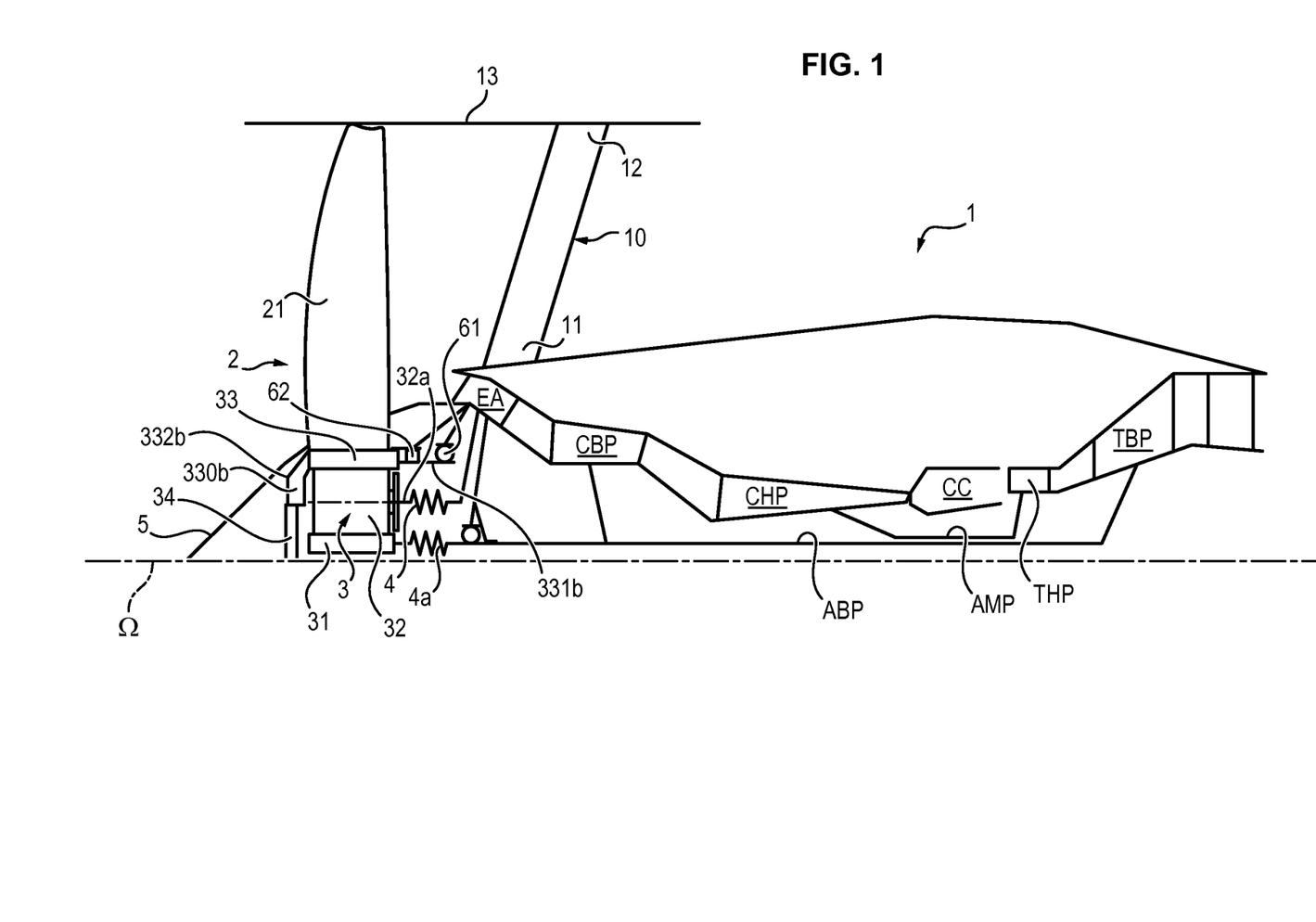
FIG. 1 shows a half-view of a section of a turbojet comprising a system for rotating a fan.

Shown in FIG. 1 is the half-view of a section of one architecture of a turbojet 1 of an aircraft which comprises a fan 2 situated upstream of said turbojet 1 so as to compress a flow of air entering the interior of said turbojet 1, this flow of air then being separated into a primary air flow and a secondary air flow. Downstream of the fan 2, the primary air flow penetrates into an annular air inlet EA formed in the casing of the turbojet 1. The primary air flow is then compressed by a low-pressure compressor CBP then by a high-pressure compressor CHP, before being burned in a combustion chamber CC. Leaving the combustion chamber CC, the primary flow then passes into a high-pressure turbine THP, then into a low-pressure turbine TBP, then is ejected from the turbojet 1. The high-pressure turbine THP drives the high-pressure compressor CHP via a high-pressure shaft AHP, and the low-pressure turbine drives the low-pressure compressor CBP via a low-pressure shaft ABP.

The low-pressure shaft ABP also drives the fan 2 in rotation around a first axis of rotation $\Omega$ via a reduction gear 3, thus forming a system for rotating said fan 2. In fact, the diameter of the fan 2 being considerable, the speed of rotation of the low-pressure shaft ABP cannot be imposed directly on the fan 2, or the end of the blades 21 of the fan 2 would have a speed higher than the speed of sound, which would strongly perturb the operation of the fan 2.

Figure 2:
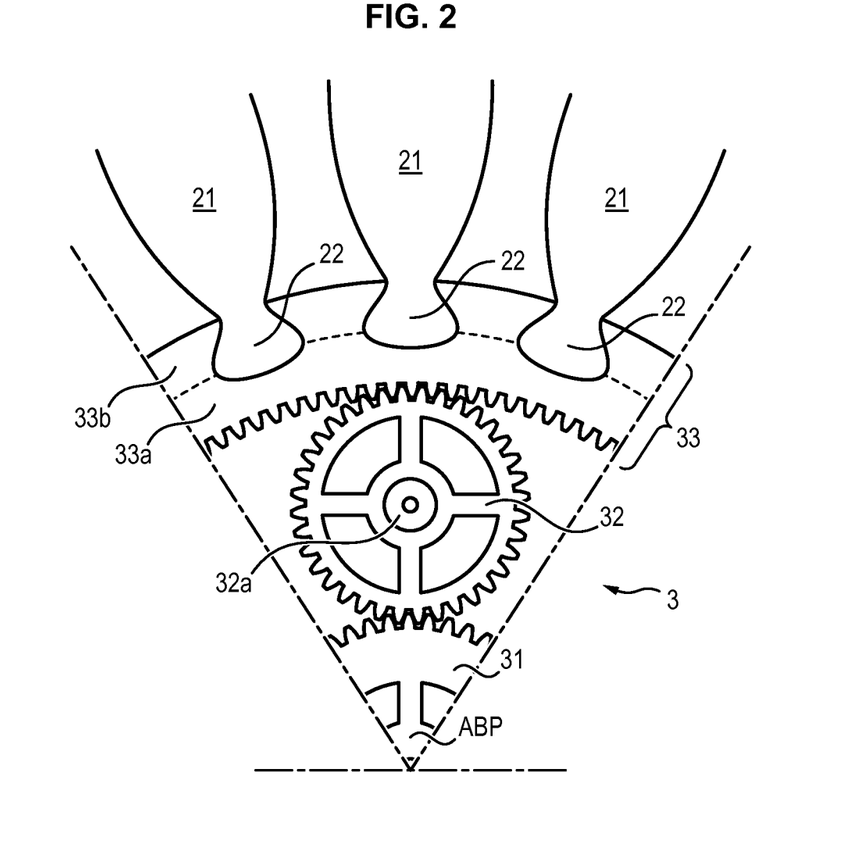
FIG. 2 shows a section of the reduction gear according to a first embodiment.
Figure 7:
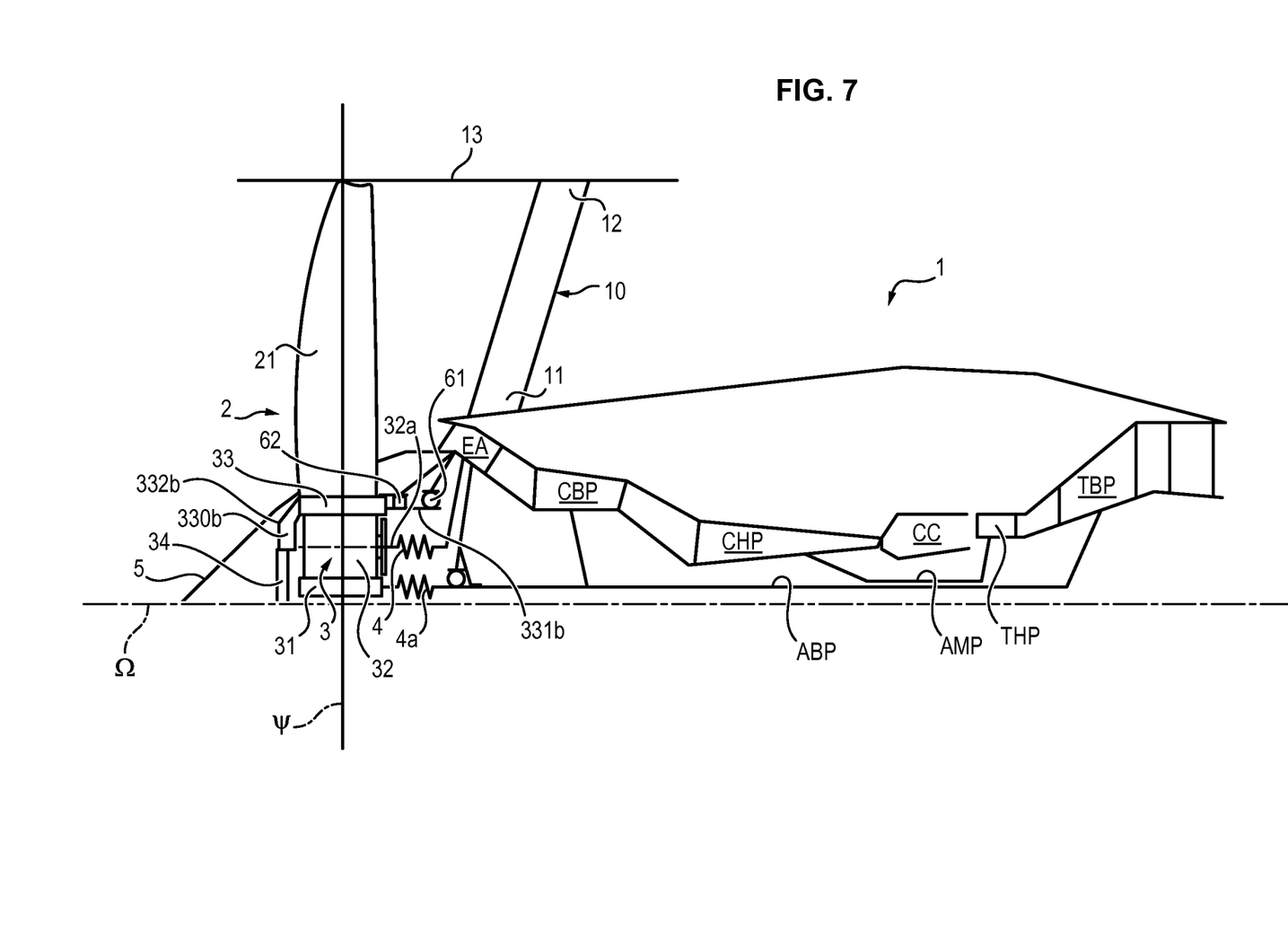
FIG. 7 shows a half-view of a section of a turbojet according to one possible embodiment.

As shown in FIG. 2, the reduction gear 3 is a planetary gearset which is situated in the center of the fan 2, and which is centered on the first axis of rotation $\Omega$. The reduction gear 3 comprises a central sun gear 31 which is attached to the low-pressure shaft ABP, at least one satellite 32 which is mounted in rotation on a satellite carrier 32a (or satellite carrier shaft), and an outer planet gear 33 (or external ring) to which are attached the blades 21 of the fan 2. A plane perpendicular to the first axis of rotation $\Omega$ passes through the reducing gear 3 and the fan 2. FIG. 7 illustrates a plane $\psi$ which is perpendicular to the first axis of rotation $\Omega$ and which passes through the reduction gear 3 and the fan 2. The section plane of FIG. 2 is a plane which is perpendicular to the first axis of rotation $\Omega$ and which passes through the reduction gear 3 and the fan 2.

The satellite 32 is situated between the planetary gears 31 and 33 and meshes with the central sun gear 31 and with the outer planet gear 33, thus transmitting the rotation movement of the central sun gear 31 to the outer planet gear 33.

The central sun gear 31 comprises teeth oriented toward the exterior. The central sun gear 31 is positioned at the center of the reduction gear 3, and is driven in rotation by the low-pressure shaft ABP around the first axis of rotation $\Omega$ aligned with the axis of rotation of the fan 2, during the operation of the turbojet 1.

The fact that the low-pressure shaft ABP which drives the fan 2 in rotation is attached to the interior sun gear 31 makes it possible to obtained the desired reduction ratio while reducing the bulk of the reduction gear 3.

The satellite 32 comprises teeth oriented toward the exterior and is driven in rotation by the central sun gear 31 around a second axis of rotation $\Delta$ which is parallel to the first axis of rotation $\Omega$ during the operation of the turbojet 1.

The outer planet gear 33 is a ring which surrounds the central sun gear 31 and the satellite 32 and which comprises teeth which are oriented toward the interior and which mesh with the teeth of said satellite 32. The exterior planet gear 33 is driven in rotation by the satellite 32 around the first axis of rotation $\Omega$ during the operation of the turbojet 1.

According to a possible variant, the central sun gear 31, the satellite 32 and the outer planet gear 33 are made of steel.

According to an advantageous variant, the teeth of the central sun gear 31, of the satellite 32 and of the outer planet gear 33 are nitrided so as to limit their wear. This feature is particularly advantageous when the central sun gear 31, the satellite 32 and the outer planet gear 33 are made of steel. In order to increase the hardness of the teeth and to limit the wear of the reduction gear 3, surface treatments can be carried out on the teeth of the central sun gear 31, of the satellite 32 and of the outer planet gear 33.

In the variant illustrated in FIG. 2, only one satellite 32 is shown, but according to other possible variants, the reduction gear 3 comprises several satellites 32. The reduction gear 3 can comprise, for example, between three and six satellites 32 which are all attached to the same satellite carrier 32a.

The outer planet gear 33 comprises, on the one hand, an internal portion 33a comprising teeth meshing with the satellite 32, and on the other hand an external portion 33b to which the blades 21 of the fan 2 are directly attached. By the fact that the blades 21 of the fan 2 are directly attached to the external portion 33b of the outer planet gear is meant here that there is no intermediate attachment part between said external portion 33b and the blades 21.

The fact that the reduction gear 3 is placed at the center of the fan 2 and that the blades 21 are directly attached to the external portion 33b of the outer planet gear 33 allows reducing the bulk and the mass of the system for rotating the fan 2, simplifying it, and also facilitating access to the reduction gear 3. A plane perpendicular to the first axis of rotation Ω (the axis Ω also being the axis of the turbine engine) passes through the blades 21, the teeth of the outer planet gear 33 with which the satellite 32 meshes. A plane perpendicular to the first axis of rotation Ω also passes through the blades 21, the teeth of the satellite 32 and the teeth of the central sun gear 31. The axial bulk of the system for rotating the fan 2 is thus reduced and the blades 21 do not hinder access to the reduction gear 3, and reciprocally the reduction gear 3 does not hinder access to the blades 21.

The internal portion 33a of the outer planet gear 33 is hollow and has a cylindrical shape of circular section directed along the first axis of rotation Ω.

The external portion 33b of the outer planet gear 33 is also hollow and also has a cylindrical shape of circular section directed along the first axis of rotation Ω.

The external portion 33b of the outer planet gear 33 comprises a balancing portion 330b extending radially toward the interior with respect to the first axis of rotation Ω and protruding from the rest of the outer planet gear 33.

Thus, as can be seen in FIG. 1, the outer planet gear 33 has a half-section along the first axis of rotation Ω shaped like an L. Expressed differently: the outer planet gear 33 has a section along the first axis of rotation Ω shaped like a ∪ comprising a hole in its center.

This balancing portion 330b forms a balancing system (or "leeks") which compensate the centrifugal forces created by the rotation of the fan 2. A first end 331b of the external portion 33b is attached to the casing of the turbojet 1 by bearings which form a pivot connection. The pivot connection allows rotation of the external portion 33b around the first axis of rotation Ω. The balancing portion 330b is, for its part, situated on a second end 332b of the external portion 33b.

In order to facilitate access to the reduction gear 3, the first end 331b of the external portion 33b of the outer planet gear 33 is situated in the downstream portion of the reduction gear 3 with respect to the flow of air circulation in the turbojet 1, and the second end 332b of said external portion 33b is, for its part, situated in the upstream portion of said reduction gear 3. Thus by withdrawing an air inlet cone 5 forming the nose section of the fan 2, direct access to the reduction gear 3 is possible without having to disassemble an additional element.

The fact that the blades 21 are directly attached to the external portion 33b of the outer planet gear 33 increases the mechanical forces which are transmitted to the reduction gear 3, and more precisely to the outer planet gear 33. In fact, the rotation of the blades 21 of the fan 2 around the first axis of rotation Ω creates a centrifugal force which generates considerable forces applied directly to the reduction gear 3, and more precisely to the outer planet gear 33.

The balancing portion 330b allows increasing the resistance of the external portion 33b to the radial forces created by the rotation of the blades 21, thus limiting the radial deformations of the external portion 33b due to these radial forces.

Moreover, the bearings by which the external portion 33b is attached to the casing of the turbojet 1, which form a pivot connection also allow increasing the resistance of the reduction gear 3 to these radial forces. In fact, the pivot connection which retains the external portion 33b prevents the radial and axial displacement of said external portion 33b. According to an advantageous variant, the bearings forming the pivot connection comprise a ball bearing 61 and a roller bearing 62. The ball bearing 61 forms an axial abutment preventing the axial displacement of the external portion 33b. The roller bearing 62 makes it possible to ensure the radial retention of the external portion 33b. The ball bearing 61 also ensures the radial retention of the external portion 33b, but to a lesser extent than the roller bearing 62. Such a pivot connection has good mechanical resistance to the forces created by the rotation of the fan 2.

Moreover, in order to ensure the retention of the fan 2 and resistance to the radial forces created by the rotation of said fan, the low-pressure shaft ABP is attached to the casing of the turbojet 1 by bearings forming a pivot connection. The pivot connection of the bearings attaching the low-pressure shaft to the casing of the turbojet 1 can be formed by a ball bearing 9 forming an axial abutment and also participating in radially retaining the low-pressure shaft ABP, as well as by one or two roller bearings not shown in FIG. 1. The ball bearing 9 is situated at the air inlet EA, while the roller bearing(s) is (are) situated in the high-pressure turbine THP.

According to a possible variant, the ball bearing 61, the roller bearing 62 and the ball bearing 9 are attached to the casing of the turbojet 1 or to the air inlet EA. The turbojet 1 comprises a load-absorbing arm 10. The load-absorbing arm 10 comprises a first end 11 attached to the casing of the turbojet 1 at the air inlet EA and a second end 12 which is attached to an external wall 13 of the turbojet 1, so as to transfer the forces applied to the reduction gear 3 and to the fan 2 to the pylon attaching the turbojet 1 to the aircraft.

According to a possible variant, the outer planet gear 33 is a single piece. Thus the internal portion 33a and the external portion 33b are a single and unique part.

According to another, equally possible variant, the internal portion 33a of the outer planet gear 33 is formed of a first wheel comprising teeth which mesh with the satellite 32, and the external portion 33b of said outer planet gear 33 is formed of a second wheel which is attached to the first wheel forming the internal portion 33a. The blades 21 of the fan 2 are directly attached to the second wheel forming the external portion 33b of the outer planet gear 33. Such a variant allows limiting the transmission of forces created by the rotation of the fan 2 to the rest of the reduction gear 3.

The attachment of the first wheel forming the internal portion 33a of the outer planet gear 33 to the second wheel forming the external portion 33b of said outer planet gear 33 can be accomplished by using splines 7. The first wheel and the second wheel can in fact comprise complementary splines 7 which allow the rotation movement of the first wheel to be transmitted to the second wheel. The first wheel therefore comprises an internal contour comprising teeth which mesh with the satellite 32, and an external contour comprising the splines 7. The second wheel comprises, for its part, an internal contour comprising the splines 7 and an external contour to which are directly attached the blades 21 of the fan 2.

The attachment between the internal portion 33a and the external portion 33b can also be accomplished by dovetails. Thus, the external portion 33b can comprise portions in the form of bulbs (or dovetails) protruding radially toward the interior of the internal contour of said external portion 33b, said portions in the form of bulbs embedding themselves in the complementary slots (also called sockets) made in the external contour of the internal portion 33a. The embedding of the portions shaped like bulbs in the slots prevents any radial displacement between the internal portion 33a and the external portion 33b. Attachment by dovetails allows a portion of the radial forces created by the rotation of the fan 2 to be transmitted to the internal portion 33a of the outer planet gear 33. The blades 21 having the same plane perpendicular to the first axis of rotation Ω passing through them as the teeth of the outer planet gear 33 with which the satellite 32 meshes, the complementary slots formed in the external portion 33b also have the same plane perpendicular to the first axis of rotation Ω passing through them as said teeth of the outer planet gear 33.

According to a possible variant, the internal portion 33a and the external portion 33b of the outer planet gear 33 consist of different materials. This variant allows a mass saving by selecting materials which are lighter and the mechanical characteristics whereof are adapted to tolerate the constraints which the internal portion 33a or the external portion must resist. For example, titanium has a smaller density than the density of steel, and a disk made of titanium has good resistance to radial deformations. Thus, according to one possible example, the internal portion 33a is made of steel, and the external portion 33b is made of titanium.

As shown in FIG. 1, according to an advantageous variant, the satellite carrier 32a is mounted fixedly in the turbojet 1 by being retained fixedly with respect to the casing of the turbojet 1. The attachment of the satellite carrier 32a to the casing of the turbojet 1 must at least block rotation of the satellite carrier 32a around its main elongation axis (rotation of the satellite carrier 32a around itself), as well as the rotation of the satellite carrier 32a around the first axis of rotation Ω (rotation around the central sun gear 31). The main axis of elongation of the satellite carrier 32 is congruent with the second axis of rotation Δ which is the axis of rotation of the satellite 32.

This variant allows a simplification of the system for rotating the fan 2. More precisely, if the satellite carrier 32a is movable and the blades 21 are attached to said satellite carrier 32a, said satellite carrier 32a must have a pin-like shape in order to bypass the outer planet gear 33, which makes the structure of the reduction gear 3 more complex. Moreover, such a bypass must be carried out on the upstream side of said outer planet gear 33 due to the bearings attaching the outer planet gear 33 to the casing of the turbojet 1. However, by bypassing the outer planet gear 33 on the upstream side, the satellite carrier 32a prevents having direct access to the outer planet gear 33 and to the satellite 32a by removing the air inlet cone 5. One possible solution for not using a satellite carrier 32a in the shape of a pin can be to lengthen the size of the blades 21, but this solution reduces the reduction ratio contributed by the reduction gear 3.

The satellite carrier 32a can comprise an elastic deformation zone 4 situated on a fraction of its length. An elastic deformation zone 4 is a zone of the satellite carrier 32a in which flexibility is greater than in the rest of said satellite carrier 32a, thus creating a preferred elastic deformation zone in said satellite carrier 32a for tolerating a displacement of the satellite 32.

This elastic deformation zone 4 separates the satellite carrier 32a into a first portion and into a second portion. The first portion is connected on the one hand to the satellite 32 and on the other hand to the elastic deformation zone 4. The second portion is connected, on the one hand, to the elastic deformation zone 4 and on the other hand [to the] casing of the turbojet 1. The second portion of the satellite carrier 32a is preferably attached to the casing of the turbojet 1 at the air inlet EA so as to transfer the forces to which the satellite carrier 32a is subjected to the load-absorbing arm 10.

The elastic deformation zone 4, which is situated between these two portions of the satellite carrier 32a, allows radial and axial displacement of the first portion with respect to the first axis of rotation Ω with respect to the second portion. The elastic deformation zone 4 therefore allows a radial and axis displacement of the satellite 32 with respect to the second axis of rotation Δ. The radial travel allowed by the elastic deformation zone 4 between the first portion and the second portion of the satellite carrier 32a is on the order of 10°.

Similarly, the low-pressure shaft ABP can also comprise an elastic deformation zone 4a. This elastic deformation zone 4a allows radial and axial displacement of a first portion of the low-pressure shaft ABP attached to the central sun gear 31 with respect to a second portion of said low-pressure shaft ABP connected to the low-pressure turbine TBP, the first and second portions of the shaft ABP being separated by an elastic deformation zone 4a. Thus, this elastic deformation zone 4a allows a radial and axis displacement of the central sun gear 31 with respect to the first axis of rotation Ω.

The elastic deformation zone 4 of the satellite carrier 32 and the elastic deformation zone 4a of the low-pressure shaft ABP allow avoiding over-constraining in position the reduction gear 3, thereby limiting the internal forces of the parts constituting the system for rotating. The axial and radial displacements of the external portion 33b of the outer planet gear 33 being prevented in order to reinforce the resistance of the outer planet gear 33 to the mechanical forces created by the rotation of the fan 2, it is preferable to allow axial or lateral displacement of the sun gear 31 and/or of the satellite 32 so as not to make the reduction gear 3 over-constrained.

The elastic deformation zones 4 and 4a can be formed by a zone in which the cross-section of the satellite carrier 32a or of the low-pressure shaft ABP is reduced with respect to the rest of the length. The elastic deformation zone 4 and 4a can also be formed by bores carried out in the satellite carrier 32a or the low-pressure shaft ABP. The elastic deformation zones 4 and 4a can also be formed by a zone on which the satellite carrier 32a or the low-pressure shaft ABP have a crenelated shape or a Z shape in the main elongation direction of the satellite carrier 32a or the low-pressure shaft ABP. A crenelated shape is formed by a radial extension of the satellite carrier 32a or the low-pressure shaft ABP, while a Z shape is created by an axial extension in direction opposite to the rest of the satellite carrier 32a or the low-pressure shaft ABP.

Figure 4:
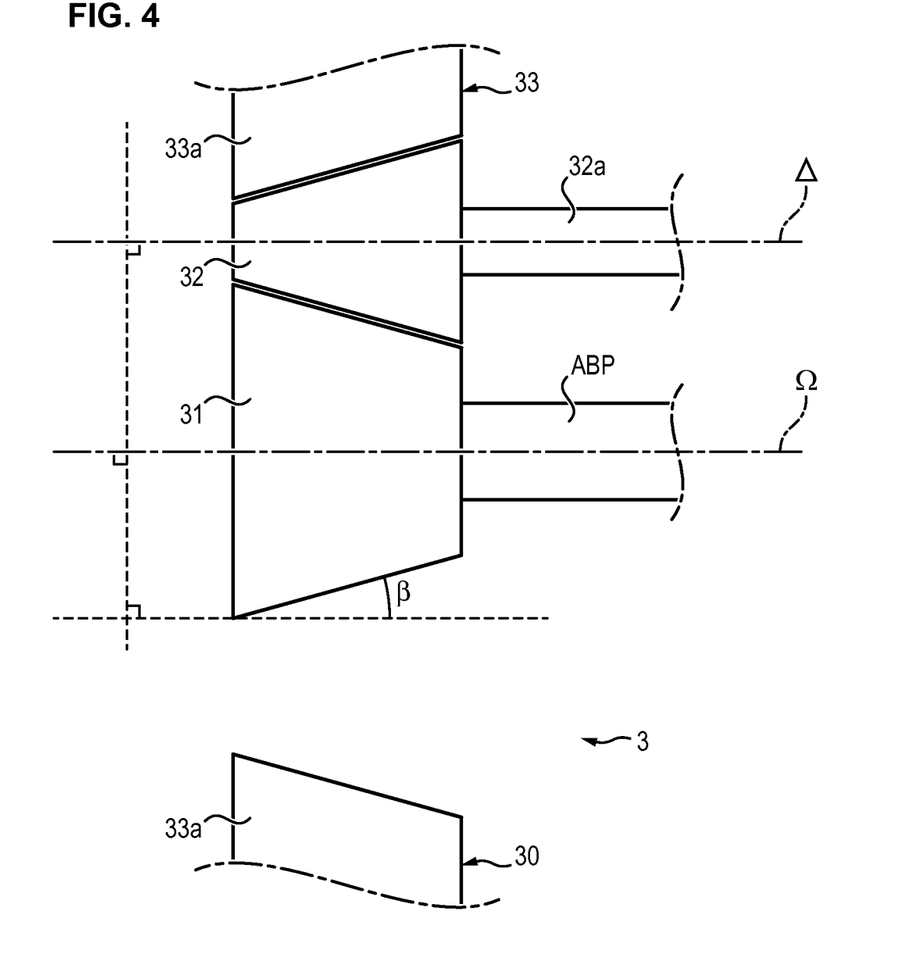
FIG. 4 shows a possible variant of conical teeth for the reduction gear.

According to an advantageous variant illustrated in FIG. 4, the central sun gear 31, the satellite 32 and the outer planet gear 33 have conical teeth.

Preferably, the conical teeth of the central sun gear 31, the satellite 32 and the outer planet gear 33 comprise a cone angle β which is comprised between 2° and 4°.

As shown in FIG. 4, in which the cone angle β is exaggerated so as to be more easily visible, the cone angle β is the angle of inclination of the teeth over the length of the part (the central sun gear 31, the satellite 32 and the outer planet gear 33). In other words, the cone angle β is the angle formed between the exterior contour of the part (taken along its pitch circle radius) and straight lines parallel to the axis of rotation of said part (the axis Ω for the central sun gear 31 and the outer planet gear 33, and the axis Δ for the satellite 32).

This variant allows facilitating the recovery of oil used to lubricate the reduction gear 3.

Moreover, in order to allow the oil to be recovered downstream of the reduction gear 3, so as not to have to place the oil recovery system between the air inlet cone 5 and the reduction gear 3, the peak of the cone formed by the teeth of the outer planet gear 33 is situated in the upstream portion of the reduction gear 3, and the base of said cone of the teeth of said outer planet gear 33 is situated in the downstream portion of said reduction gear 3. The peak of the cone formed by the teeth of the outer planet gear 33 is the end of said cone having the smaller diameter, and the base of the cone formed by the teeth of the outer planet gear 33 is the end of said cone having the greater diameter.

Figure 5A:
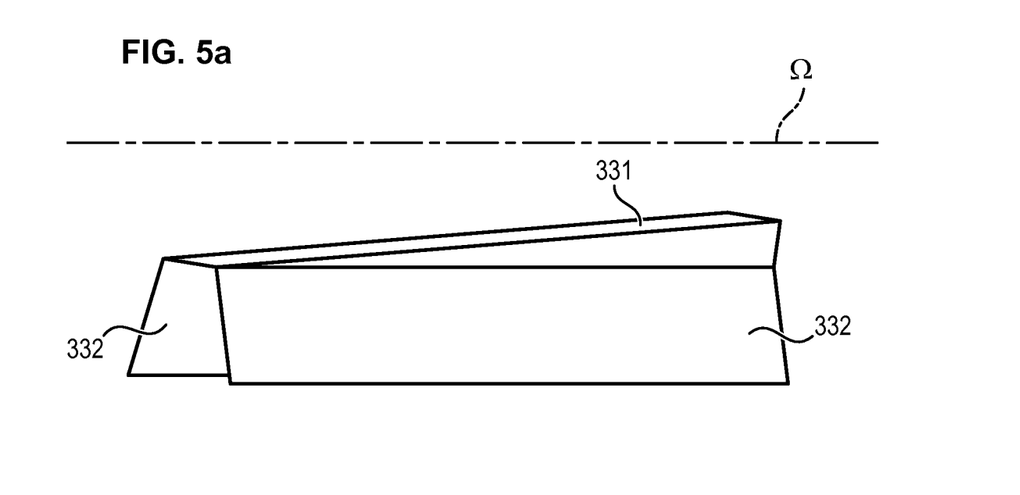
FIGS. 5a, 5b and 5c show a tooth root of the outer planet gear of the reduction gear according to a possible variant of the outer planet gear.

According to another possible variant which is illustrated in FIGS. 5a, 5b, 5c and 6, also allowing oil recovery to be facilitated, the interior planet gear 31, the satellite 32 and the outer planet gear 33 have straight teeth, and said outer planet gear 33 comprises a variable depth tooth root of conical shape. More precisely, the outer planet gear 33 comprises a tooth root 331 of which the depth increases along the first axis of rotation Ω, as shown in FIG. 5a on which only one tooth root 331 of the outer planet gear is shown in a perspective view.

The tooth root 331 is the surface which separates two adjoining teeth 332. In other words, the space between two adjoining teeth 332 has the shape of a straight trapezoidal prism which comprises a face which is situated toward the exterior of the outer planet gear, thus forming a peak of said trapezoidal prism, a straight triangular prism being superimposed on the peak of said trapezoidal prism on one face which is identical to the face which forms the peak of the trapezoidal prism.

Figure 5B:
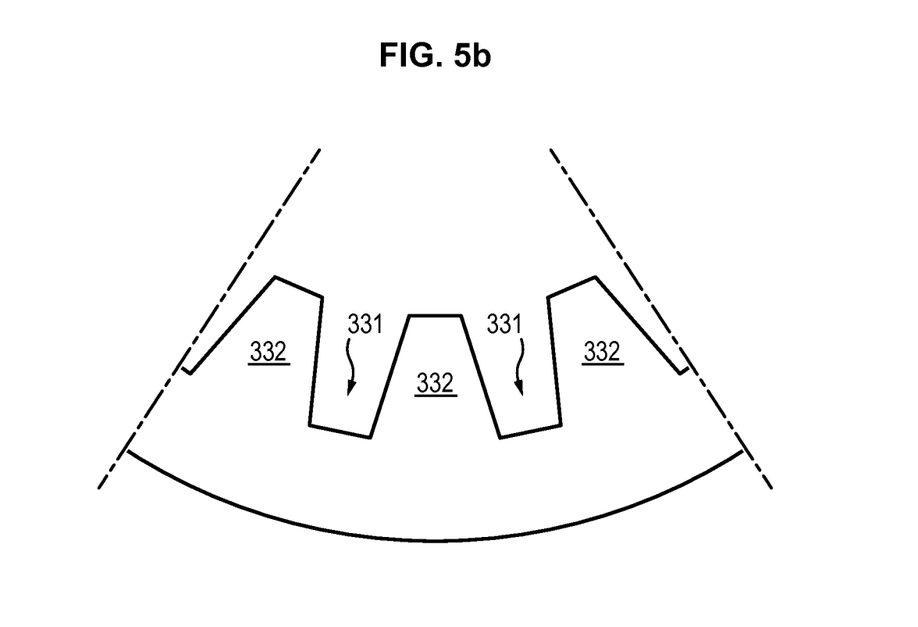
Figure 5C:
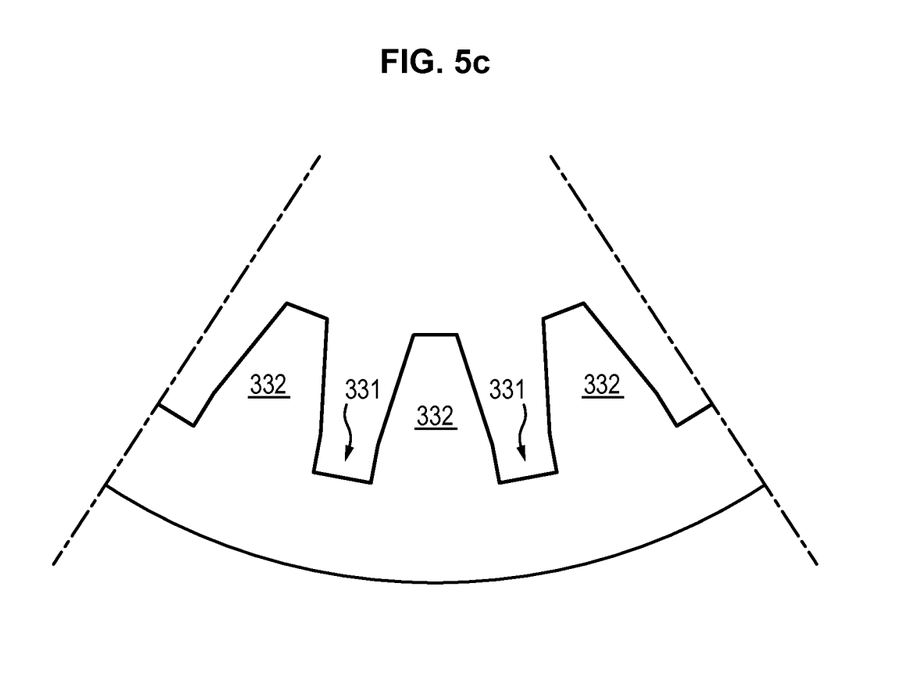

Shown in FIG. 5b is a front view of a first end of the outer planet gear 33, and in FIG. 5c a front view of a second end of the outer planet gear 33. As can be seen in FIGS. 5b and 5c, the depth of the tooth root 331 is greater at the second end compared to the depth of the tooth root 31 at the first end, the depth of said tooth root 331 increasing along the first axis of rotation Ω.

Moreover, in order to recover the oil lubricating the reduction gear 3 in its downstream portion, the cone formed by the tooth root 331 of the outer planet gear 3 has its peak on the upstream side of the reduction gear 3 and its base on the downstream side of said reduction gear 3. Thus it is not necessary to dispose an oil recovery system between the air inlet cone 5 and the reduction gear 3; a single oil recovery system can be situated only downstream of the reduction gear 3, simplifying the system for rotating the fan and thus facilitating access to the reduction gear 3. The peak of the cone formed by the tooth root 331 of the outer planet gear 33 is the end of said cone having the smaller diameter, and the base of the cone formed by the toot root 331 of the outer planet gear 33 is the end of said cone having the larger diameter. Expressed in another way, the face of the outer planet gear 33 illustrated in FIG. 5b is situated in the upstream portion, and the face illustrated in FIG. 5c is situated in the downstream portion.

Figure 6:
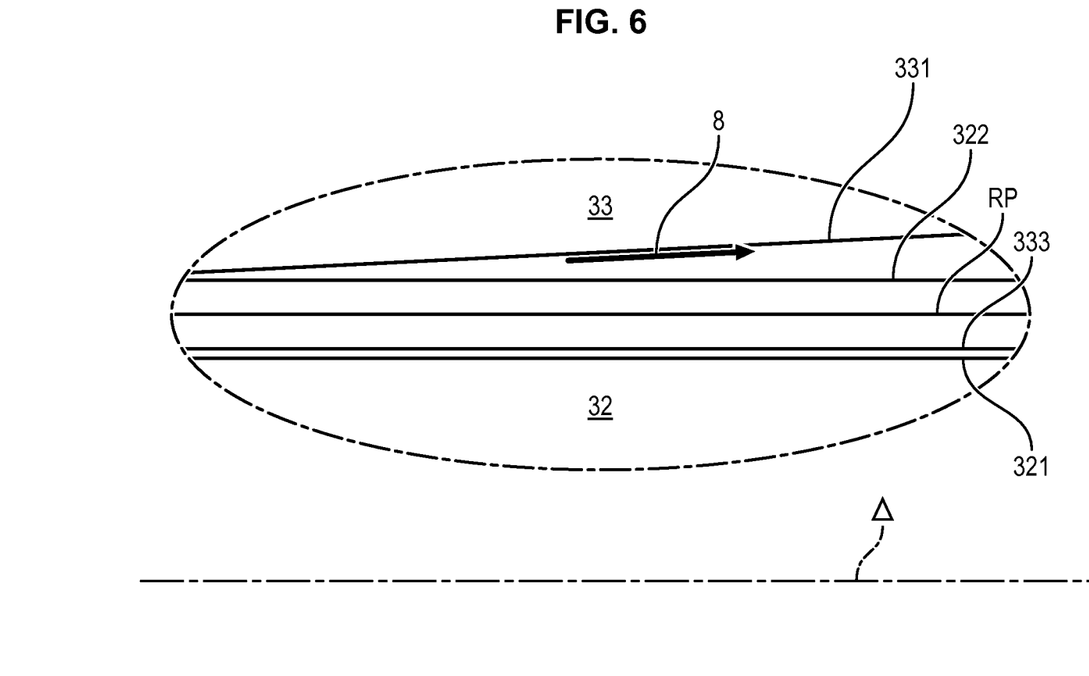
FIG. 6 shows a detailed view of the meshing between a satellite and the outer planet gear according to a possible variant of the outer planet gear.

Thus this variant allows meshing as shown in FIG. 6 between the satellite 32 and the outer planet gear 33, thus allowing circulation of the oil from upstream of the reduction gear 3 to downstream of said reduction gear 3. More precisely, the satellite 32 and the outer planet gear 33 having straight teeth, said satellite 32 and said outer planet gear 33 have a pitch circle radius RP which is parallel to the first axis of rotation Ω and to the second axis of rotation Δ. The outer planet gear 33 being meshed with the satellite 32, the tooth crown 333 of the outer planet gear 33 is supported against the tooth root 321 of the satellite 32. However, the tooth root 331 of the outer planet 33 being conical, the tooth crown 322 of the satellite 32 is supported against said tooth root 331 of said outer planet gear 33 only on the upstream portion of the reduction gear 3. A space separates the tooth crown 322 of the satellite 32 and the tooth root 331 of the outer planet gear 33 on the rest of the reduction gear 3, this space increasing along the first axis of rotation Ω. The flow of oil 8 therefore circulates in the space between the tooth root 331 of the outer planetary gear 33 and the tooth crown 322 of the satellite 32. The flow of oil 8 circulates from the upstream portion of the gear reduction 3 toward the downstream portion of the gear reduction 3.

Figure 3:
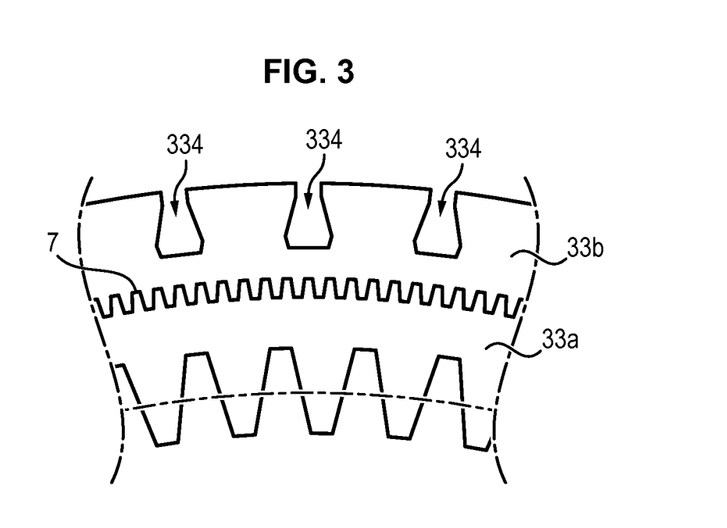
FIG. 3 shows schematically a portion of an outer planet gear of a reduction gear according to a possible variant of the outer planet gear.

According to a possible variant of attachment of the blades 21 to the outer planet gear 33, the blades 21 comprise a root 22 in the form of a dovetail (or bulb) which is embedded in a slot 334 (or socket) which is formed on the exterior contour of the external portion 33b of the outer planet gear 33, as illustrated in FIGS. 2 and 3. The slots 334 have a shape complementary to the shape of the dovetail of the root 22 of the blades 21, so as to prevent any radial relative movement between the blade 21 and the external portion 33b. Such an attachment of the blades 21 allows the forces created by the centrifugal force to be correctly absorbed by the outer planet gear 33.

According to a first variant illustrated in FIG. 2, a portion of the slots 334 is formed in the internal portion 33a of the outer planet gear 33.

According to a second variant illustrated in FIG. 3, the slots 334 are only formed in the external portion 33b.

According to an advantageous variant illustrated in FIG. 1, the reduction gear 3 is placed in a casing which comprises a removable cover 34 which is situated opposite said reduction gear 3. Preferably, the removable cover 34 is situated upstream of the reduction gear 3, between the air inlet cone 5 of the turbojet 1 and said reduction gear 3. Thus the reduction gear 3 can be directly accessible by withdrawing the air inlet cone 5 and the removable cover 34, thus limiting the number of elements to be withdrawn for gaining access to the reduction gear 3. Moreover, the removable cover 34 can be integral with the air inlet cone 5 so that it is no longer necessary to withdraw the removable cover 34 after having withdrawn the air inlet cone 5.

The removable cover 34 can have a circular shape and be attached to the balancing portion 330b, said removable cover then being centered on the first axis of rotation Ω. The removable cover can be attached to the balancing portion 330b so as to close the hole formed in the center of the outer planet gear 33.

The invention claimed is:

1. An assembly comprising:
   a fan of a turbojet, the fan comprising at least one blade; and a system for rotating the fan around an axis of rotation comprising a reduction gear formed from a planetary gearset which comprises:

a central sun gear;

an outer planet gear attached to the fan;

at least one satellite arranged between the central sun gear and the outer planet gear for a transmission of a rotation movement between the central sun gear and the outer planet gear;

wherein the reduction gear is situated in a center of the fan so that a virtual plane perpendicular to different planes in which the axis of rotation lies passes through the reduction gear and the fan, wherein the outer planet gear comprises an internal portion and an external portion, the internal portion being meshed with the satellite and the external portion being directly attached to the at least one blade of the fan, the external portion comprising at least one recess, the at least one blade comprising a protrusion, wherein inserting the protrusion in the recess directly attaches the external portion to the at least one blade, wherein the external portion comprises a second end situated upstream of the reduction gear with respect to the flow of air circulation in the turbojet and a balancing portion, at the second end, extending radially toward the interior with respect to the axis of rotation and protruding from the outer planet gear, wherein the reduction gear is situated in a casing which comprises a removable cover which is situated upstream the reduction gear, the removable cover being attached to the balancing portion.

2. The assembly according to claim 1, wherein the external portion of the outer planet gear is attached by a first end to a casing of the turbojet by a pivot connection.

3. The assembly according to claim 2, wherein the pivot connection comprises a ball bearing and a roller bearing.

4. The assembly according to claim 1, wherein the protrusion is in a form of a dovetail and the recess is of a complementary shape to the form of the dovetail.

5. The assembly according to claim 1, wherein the oute planet gear is a single piece.

6. The assembly according to claim 1, wherein the internal portion of the outer planet gear is formed from a first wheel comprising teeth which mesh with the satellite, and in which the external portion of said outer planet gear is formed from a second wheel which is attached to said first wheel forming the internal portion of the outer planet gear.

7. The assembly according to claim 1, wherein the satellite is mounted in rotation on a satellite carrier comprising a main axis of elongation, said satellite carrier being held fixed with respect to a casing of the turbojet.

8. The assembly according to claim 7, wherein the central sun gear is attached to a shaft which comprises an elastic deformation zone allowing radial and axial displacement of the central sun gear with respect to the axis of rotation, and/or wherein the satellite carrier comprises an elastic deformation zone allowing radial and axial displacement of the satellite with respect to the axis of rotation.

9. The assembly according to claim 1, wherein the central sun gear and the satellite have straight teeth so that a tooth crown of the sun gear, a tooth root of the sun gear, a tooth crown of the satellite and a tooth root of the satellite are aligned with the axis of rotation and the outer planet gear have a tooth crown aligned with the axis of rotation and a tooth root a depth of which increases along the axis or rotation, so that the tooth crown of the satellite is supported against the tooth root of the outer planet gear on an upstream portion of the reduction gear with respect to the flow of air circulation in the turbojet, and a space separates the tooth crown of the satellite and the tooth root of the outer planet gear on a downstream portion of the reduction gear, this space increasing in the downstream direction along the axis of rotation.

10. The assembly according to claim 1, wherein the virtual plane passes through the at least one blade of the fan, teeth of the at least one satellite and teeth of the central sun gear.

11. The assembly according to claim 2, wherein the first end is situated downstream of the reduction gear with respect to the flow of air circulation in the turbojet.

12. The assembly according to claim 1, wherein the removable cover is situated between the reduction gear and an air inlet cone 5 forming a nose section of the fan.

13. The assembly according to claim 12, wherein the removable cover is integral with the air inlet cone.

14. The assembly according to claim 8, wherein the elastic deformation zone is a zone in which the cross-section of the shaft or of the satellite carrier is reduced with respect to the rest of the shaft or of the satellite carrier.

15. The assembly according to claim 8, wherein the elastic deformation zone is formed by bores carried out in the shaft or in the satellite carrier.

16. The assembly according to claim 8, wherein the elastic deformation zone is a zone on which the shaft or the satellite carrier have a crenelated shape or a Z-shape in the main elongation direction of the shaft or the satellite carrier, the crenelated shape being formed by a radial extension of the shaft or the satellite carrier, while a Z shape is created by an axial extension in direction opposite to the rest of the shaft or the satellite carrier.

17. An assembly comprising a fan of a turbojet, the fan comprising at least one blade; and a system for rotating the fan around an axis of rotation comprising a reduction gear formed from a planetary gearset which comprises:

a central sun gear;

an outer planet gear attached to the fan;

at least one satellite arranged between the central sun gear and the outer planet gear for a transmission of a rotation movement between the central sun gear and the outer planet gear;

wherein the reduction gear is situated in a center of the fan so that a virtual plane perpendicular to different planes in which the axis of rotation lies passes through both the reduction gear and the at least one blade, wherein the outer planet gear comprises an internal portion and an external portion, the internal portion being meshed with the satellite and the external portion being directly attached to the at least one blade of the fan, the external portion comprising at least one recess, the at least one blade comprising a protrusion, wherein inserting the protrusion in the recess directly attaches the external portion to the at least one blade, wherein the external portion comprises a second end situated upstream of the reduction gear with respect to the flow of air circulation in the turbojet and a balancing portion, at the second end, extending radially toward the interior with respect to the axis of rotation and protruding from the outer planet gear.

wherein the reduction gear is situated in a casing which comprises a removable cover which is situated upstream the reduction gear, the removable cover being attached to the balancing portion.

18. An assembly comprising:

a fan of a turbojet, the fan comprising at least one blade; and a system for rotating the fan around an axis of rotation comprising a reduction gear formed from a planetary gearset which comprises:
a central sun gear;
an outer planet gear attached to the fan;
at least one satellite arranged between the central sun gear and the outer planet gear for a transmission of a rotation movement between the central sun gear and the outer planet gear;
wherein the reduction gear is situated in a center of the fan so that a virtual plane perpendicular to different planes in which the axis of rotation lies passes through the reduction gear and the fan,
wherein the outer planet gear comprises an internal portion and an external portion, the internal portion being meshed with the satellite and the external portion being directly attached to the at least one blade of the fan, the external portion comprising at least one recess, the at least one blade comprising a protrusion, wherein inserting the protrusion in the recess directly attaches the external portion to the at least one blade,
wherein the external portion comprises a second end situated upstream of the reduction gear with respect to the flow of air circulation in the turbojet and a balancing portion, at the second end, extending radially toward the interior with respect to the axis of rotation and protruding from the outer planet gear.
wherein the reduction gear is situated in a casing which comprises a removable cover which is situated upstream the reduction gear, the removable cover being attached to the balancing portion,
wherein the central sun gear, the outer planet gear and the satellite have conical teeth.

19. The assembly according to claim 18, wherein the conical teeth of the central sun gear, the satellite and the outer planet gear comprise an angle of inclination of the teeth over the length of the part with respect to the axis of rotation which is comprised between 2° and 4°.

20. The assembly according to claim 18, wherein the conical teeth of the outer planet gear are configured to form a cone comprising a peak formed at an upstream end of the outer planet gear and a base formed at a downstream end of the outer planet gear, the cone having a diameter increasing from the peak to the base.

* * * * *